United States Patent
Sasaki (10) Patent No.: US 7,564,581 B2
(45) Date of Patent: Jul. 21, 2009

(54) NUMERICAL PROCESSING APPARATUS, COLOR PROCESSING APPARATUS, NUMERICAL PROCESSING PROGRAM, COLOR PROCESSING PROGRAM, AND STORAGE MEDIUM

(75) Inventor: Makoto Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 756 days.

(21) Appl. No.: 10/777,378

(22) Filed: Feb. 13, 2004

(65) Prior Publication Data
US 2005/0036161 A1 Feb. 17, 2005

(30) Foreign Application Priority Data
Aug. 11, 2003 (JP) .............................. 2003-291082

(51) Int. Cl.
*G06F 15/00* (2006.01)
*G06K 1/00* (2006.01)
*H04N 1/60* (2006.01)
*G03F 3/08* (2006.01)

(52) U.S. Cl. ........................................ 358/1.9; 358/518
(58) Field of Classification Search .................. 358/1.9, 358/518
See application file for complete search history.

(56) References Cited

U.S. PATENT DOCUMENTS

| 6,919,972 B2* | 7/2005 | Kumada et al. ............... 358/1.9 |
| 7,196,823 B2 | 3/2007 | Hagai et al. |
| 2001/0035968 A1 | 11/2001 | Higashikata et al. |
| 2003/0072018 A1* | 4/2003 | Sasaki et al. .................. 358/1.9 |

FOREIGN PATENT DOCUMENTS

| JP | A 10-262157 | 9/1998 |
| JP | A 2002-10096 | 1/2002 |
| JP | A 2003-125210 | 4/2003 |
| JP | A-2003-158639 | 5/2003 |

\* cited by examiner

*Primary Examiner*—Douglas Q Tran
(74) *Attorney, Agent, or Firm*—Oliff & Berridge, PLC (57) ABSTRACT

A limited output color group generation section generates in advance, from a group of input colors (limited input color group) satisfying a constraint condition set in an input color space in advance, a group of output colors (limited output color group) in an output color space corresponding to the input colors. An input color element determination section determines at least one element of input colors satisfying the constraint condition using the limited input color group and the limited output color group. Since the limited input color group and the limited output color group satisfy the constraint condition, at least one element of the input colors satisfying the constraint condition can be determined easily.

14 Claims, 7 Drawing Sheets

L*a*b* COLOR SPACE
(OUTPUT COLOR SPACE)

NUMERICAL PROCESSING APPARATUS, COLOR PROCESSING APPARATUS, NUMERICAL PROCESSING PROGRAM, COLOR PROCESSING PROGRAM, AND STORAGE MEDIUM

The present disclosure relates to the subject matter contained in Japanese Patent Application No. 2003-291082 filed on Aug. 11, 2003, which is incorporated herein by reference in its entirety.

BACKGROUND OF THE INVENTION

1. Field of the Invention

The present invention relates to a numerical processing apparatus for deciding correspondence relation between output points in an output space of m dimensions and input points in an input space of n dimensions (m<n). Particularly, the invention relates to a color processing apparatus in a case where a CMYK color space and an L*a*b* color space are used as an input color space and an output color space, respectively on the assumption that a constraint condition is provided for input colors in the CMYK color space.

2. Description of the Related Art

Most printers receive color signals based on a color space such as RGB or L*a*b* and converts the color space into a CMYK color space having C (cyan), M (magenta), Y (yellow) and K (black) as elements, so that an image is formed by using color materials of C, M, Y and K. For various reasons caused by the image forming method and the properties of the color materials used in the printer, there is a possibility that the color of a formed image may be different from the color expressed by a received color signal. Therefore, color conversion is made at the time of formation of an image so that the color of the formed image and the color expressed by the received color signal coincide with each other as correctly as possible.

In order to obtain coincidence between the color of the formed image and the color expressed by the received color signal as described above, color conversion must be made while consideration is given to the characteristic of the printer. For this reason, a color signal in the CMYK color space, which generally serves as a color signal after color conversion is, for example, given as a color patch to form an image. The formed image is measured with a calorimeter to obtain a color signal, for example, in the L*a*b* color space. Then, a printer model is generated on the basis of a pair of the color signal in the CMYK color space and the color signal in the L*a*b* color space. A color signal in the L*a*b* color space is converted into a color signal in the CMYK color space in accordance with a model reverse to the printer model. As a result, the received color signal in the L*a*b* color space can be made substantially coincident with the measured value of the color of the formed image, so that faithful color reproduction can be achieved.

In the printer model generated in the aforementioned process, the CMYK color space is an input color space, and the L*a*b* color space is an output color space. The input-output relation in this printer model applies to the relation between the input (color) space and the output (color) space in the following description. When the color signal in the CMYK color space is obtained on the basis of the color signal in the L*a*b* color space in accordance with the reverse model, the value of the color signal in the CMYK color space cannot be decided uniquely because conversion of a three-dimensional space to a four-dimensional space is generally required. Therefore, the values of C, M and Y are predicted on the basis of the measured color signal in the L*a*b* color space and the value of K in the color patch.

In the printer, the total amount per pixel of the CMYK color materials used may be controlled in advance to ensure device performance. If the total amount of the predicted values of C, M and Y and the given value of K is larger than the threshold of total amount control, it is necessary to provide a process of controlling the total amount to be not larger than the threshold. If the value of K is not decided to satisfy the total amount control, the values of C, M and Y cannot be calculated.

A specific example will be described. Assume now that the allowable range of each of elements of C, M, Y and K is expressed as a range of from 0% to 100%. Assume that the total amount of C, M, Y and K is given by the expression:

$$C+M+Y+K=315\%$$

when the threshold of total amount control is 300%, and the values of C, M and Y predicted on the basis of K=30% are C=100%, M=90% and Y=95% respectively. In this state, the total amount cannot satisfy the total amount control. Therefore, the value of K given together with the values of L*, a* and b* must be changed to thereby change the predicted values of C, M and Y to satisfy the total amount control.

SUMMARY OF THE INVENTION

The present invention has been made to provide a numerical processing apparatus in which points satisfying a certain constraint condition in an input space of n dimensions can be calculated at a high speed on the basis of points in an output space of m dimensions without use of any point-search process when a correspondence from the output space to the input space cannot be decided uniquely though a correspondence from the input space to the output space is unique in a case where the n dimensions of the input space are larger than the m dimensions of the output space.

Another aspect of the invention is to apply the numerical processing apparatus to a color conversion process for a color image to thereby provide a color processing apparatus in which input points (colors) satisfying a constraint condition in an input color space of n dimensions can be calculated at a high speed on the basis of output points (colors) in an output color space of m dimensions.

A further aspect of the invention is to provide a numerical processing program/color processing program for making a computer execute the function of the numerical processing apparatus/color processing apparatus, and a storage medium for storing the numerical processing program/color processing program.

A numerical processing apparatus decides correspondence from output points in an output space of m dimensions to input points in an input space of n dimensions wherein m is smaller than n. The numerical processing apparatus includes a limited output point group generation unit and an input point element determination unit. The limited output point group generation unit generates a limited output point group in the output space corresponding to a limited input point group satisfying a predetermined constraint condition set in the input space in advance. The input point element determination unit determines at least one element of the input point satisfying the constraint condition, when an output point is given, on the basis of the limited input point group and the generated limited output point group. Moreover, other elements of the input points can be determined on the basis of the at least one determined element of the input point and the output point.

In the numerical processing apparatus, a limited input point group satisfying a constraint condition and a limited output point group corresponding to the limited input point group are determined as a pair of limited point groups before at least one element of the input points is determined on the basis of the limited input point group and the generated limited output point group. The group of limited input points belonging to the pair of limited point groups are guaranteed to satisfy the constraint condition. Accordingly, at least one element of the input points determined on the basis of the limited input point group and the generated output point group and other elements of the input points determined on the basis of the determined element and the output points can satisfy the constraint condition. Because all input points corresponding to the given output points and satisfying the constraint condition can be determined without searching in this manner, high-speed processing can be made.

The numerical processing apparatus can be applied to color processing for a color image to thereby form a color processing apparatus. That is, a color processing apparatus decides correspondence from output colors in an output color space of m dimensions to input colors in an input color space of n dimensions wherein m is smaller than n. The color processing apparatus includes a limited output color group generation unit and an input color element determination unit. The limited output color group generation unit generates a limited output color group in the output color space corresponding to a limited input color group satisfying a predetermined constraint condition set in the input color space in advance. The input color element determination unit determines at least one element of the input color satisfying the constraint condition, when an output color is given, on the basis of the limited input color group and the generated limited output color group. Moreover, other elements of the input colors can be determined on the basis of the at least one determined element of the input color and the output color.

When, for example, the input color space is a CMYK color space, the constraint condition may include a condition of total amount control in which the total amount of C, M, Y and K is selected to be equal to a value, which is set in advance. Alternatively, for example, the maximum value in an allowable range of any one of C, M and Y may be used as the constraint condition.

In a specific example, total amount control may be used as the constraint condition when the input color space and the output color space are a CMYK color space and an L*a*b* color space, respectively. In this case, an L*a*b* output color group corresponding to a CMYK input color group satisfying the constraint condition is determined in advance to generate a pair of limited color groups. In the generated pair of limited color groups, the values of L*, a* and b* and the value of K are used in combination so that the value of K satisfying the condition of total amount control is decided on the basis of the given values of L*, a* and b*. Moreover, when the values of C, M and Y are determined on the basis of the decided value of K and the values of L*, a* and b*, the values of C, M, Y and K satisfying the constraint condition can be obtained.

As described above, the process for determining at least one element of the input points (colors) satisfying the constraint condition on the basis of the output points (colors) and the process for determining other elements of the input points (colors) on the basis of the determined element of the input points (colors) and the output points (colors) do not contain a search process which takes a great deal of processing time. Accordingly, processing can be made in a short time and at a high speed.

The invention further provides a numerical processing method/color processing method and a numerical processing program/color processing program for making a computer execute the function of the numerical processing apparatus/color processing apparatus. The invention further provides a storage medium for storing the numerical processing program/color processing program.

As described above, a limited output point group as a group of points in an output space corresponding to a limited input point group as a group of input points satisfying a certain constraint condition is determined on the basis of the limited input point group in advance to thereby generate a pair of limited point groups as a pair of the limited input point group and the limited output point group. The generated pair of limited point groups are used so that at least one element of the input points satisfying the constraint condition is determined when the output point is given. Other elements of the input points can be further determined on the basis of at least one determined element of the input points and the output points.

Because the process does not contain any search process taking a great deal of processing time for performing repeatedly calculation, there is an effect that at least one element of the input points can be calculated in a short time and at a high speed, and that the other elements of the input points can be further obtained.

Because the numerical processing can be applied to color processing for a color image or the like, there is an effect that the process for determining at least one element satisfying a constraint condition in an input color space on the basis of a color signal in an output color space and further obtaining other elements in the input color space can be performed in a short time and at a high speed.

DETAILED DESCRIPTION OF THE PREFERRED EMBODIMENTS

Figure 1:
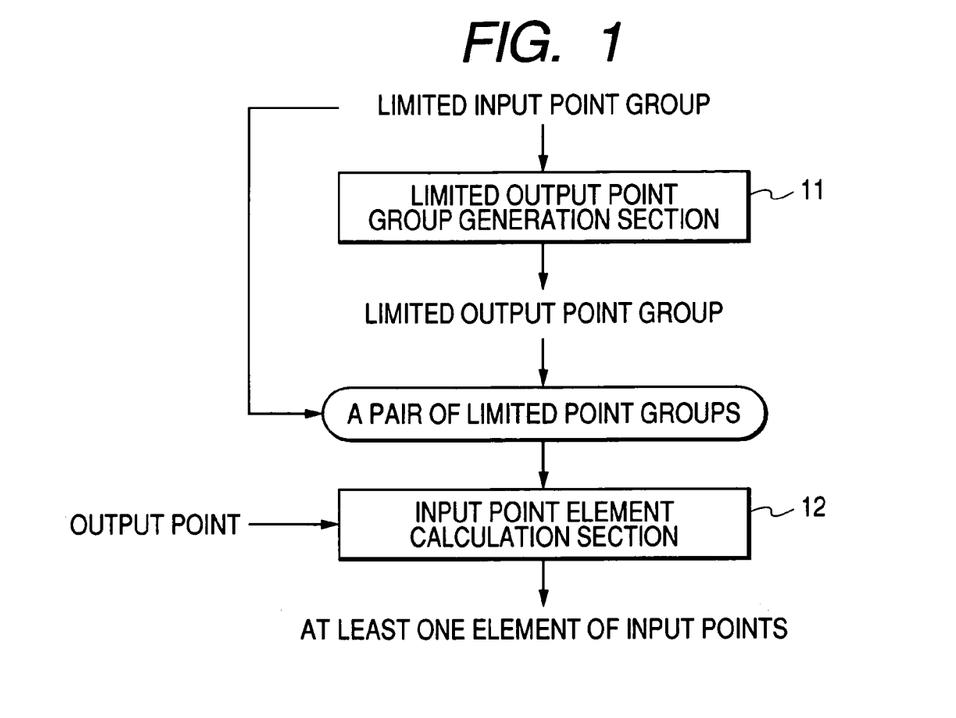
FIG. 1 is a block diagram showing a numerical processing apparatus according to a first embodiment of the invention.

FIG. 1 is a block diagram showing a numerical processing apparatus according to a first embodiment of the invention. In FIG. 1, the reference numeral 11 designates a limited output point group generation section; and 12, an input point element calculation section. In the embodiment of the invention, correspondence from output points in an output space of m dimensions to input points in an input space of n dimensions is decided. On this occasion, the number m of dimensions in the output space is smaller than the number n of dimensions in the input space (m<n). For this reason, correspondence from the output space of m dimensions smaller in number of dimensions to the input space of n dimensions larger in number of dimensions cannot be generally decided uniquely, that is, the correspondence is undefined. Therefore, a constraint condition is given to the input space. When, for example, a condition that correspondence from output points to input points is decided uniquely is used as the constraint condition, correspondence from output points in the output space of m dimensions to input points in the input space of n dimensions can be decided uniquely. On the other hand, correspondence from input points in the input space of n dimensions to output points in the output space of m dimensions can be decided so uniquely that one output point can be specified on the basis of one input point, because conversion is made in a direction of decreasing the number of dimensions. If there is no constraint condition in this case, there is a possibility that a plurality of input points may correspond to one output point.

The limited output point group generation section 11 receives input points satisfying a constraint condition set in advance in an input space and calculates output points in an output space corresponding to the input points. Output points corresponding to a large number of input points satisfying the constraint condition are calculated. The group of input points satisfying the constraint condition is referred to as "limited input point group". The group of output points in the output space corresponding to the limited input point group is referred to as "limited output point group". The pair of the limited input point group and the limited output point group generated by the limited output point group generation section 11 are referred to as a "pair of limited point groups".

The input point element calculation section 12 uses the pair of limited point groups for calculating at least one element of the input points satisfying the constraint condition on the basis of the given output points. On this occasion, a pair of the limited output point group and the group containing at least one element to be calculated among the corresponding limited input point group are used among the pairs of limited point groups so that elements to be calculated among n elements of the input points can be calculated on the basis of the pair of the limited output point group and the group containing at least one element of the limited input point group. Because the limited input point group among the pair of limited point groups satisfies the constraint condition, the obtained elements to be calculated among the input points can be guaranteed to satisfy the constraint condition.

Figure 2:
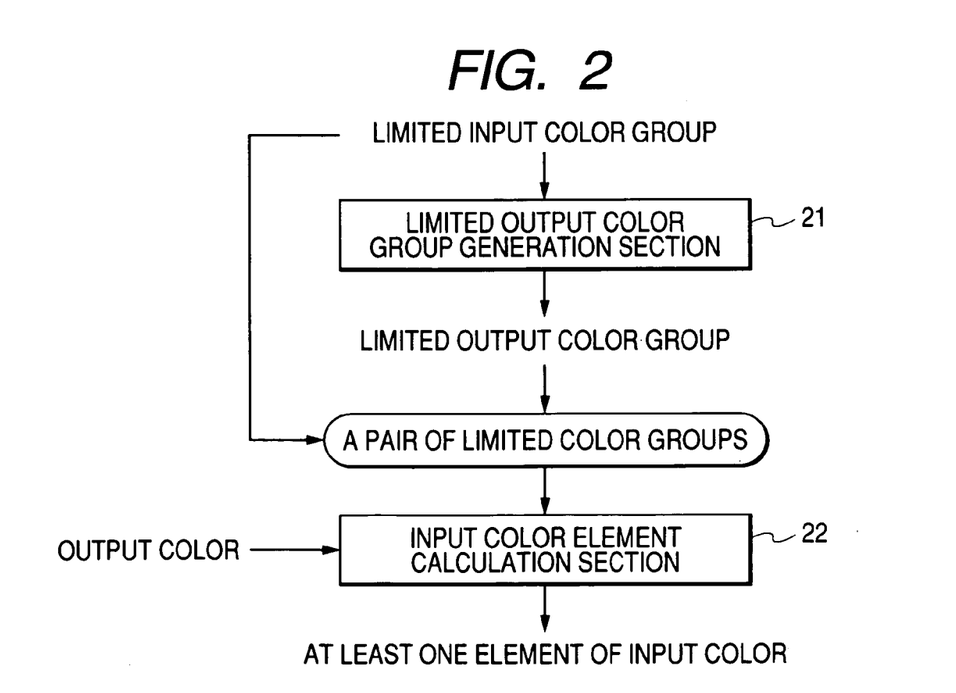
FIG. 2 is a block diagram showing a color processing apparatus according to the first embodiment the invention.

This configuration can be applied to color processing for a color image. FIG. 2 is a block diagram showing a color processing apparatus according to a first embodiment of the invention. In FIG. 2, the reference numeral 21 designates a limited output color group generation section; and 22, an input color element calculation section. In the embodiment of the invention, correspondence from output colors in an output color space of m dimensions to input colors in an input color space of n dimensions is decided. Although description will be made by way of example on a case where the output color space and the input color space are an L*a*b* color space and a CMYK color space, respectively, the invention is not limited thereto. For example, the invention may be applied to color conversion for an arbitrary output color space of m dimensions and an arbitrary input color space of n dimensions (m<n). A constraint condition is given to the input color space in the same manner as described above. For example, a condition for deciding correspondence from output colors to input colors uniquely can be set as the constraint condition. For example, a condition for controlling the total amount of color materials, a condition of the maximum amount in an allowable range of each color material, a condition of input points for distributing output colors corresponding to input points onto a curved surface corresponding to the value of K (black), which is an element of the input colors, may be used as the constraint condition.

The limited output color group generation section 21 receives input colors satisfying a constraint condition set in advance in an input color space and calculates output colors in an output color space corresponding to the input colors. Output colors corresponding to a large number of input colors satisfying the constraint condition are calculated. The group of input colors satisfying the constraint condition is referred to as "limited input color group". The group of output colors in the output color space corresponding to the limited input color group is referred to as "limited output color group". The pair of the limited input color group and the limited output color group generated by the limited output color group generation section 21 are referred to as "pair of limited point groups".

The input color element calculation section 22 uses the pair of limited color groups for calculating at least one element of the input colors satisfying the constraint condition on the basis of the given output colors. On this occasion, a pair of the limited output color group and the group containing at least one element to be calculated among the corresponding limited input color group are used among the pair of limited color groups so that elements to be calculated among n elements of the input colors can be calculated on the basis of the pair of the limited output color group and the group containing at least one element of the limited input color group. Because the limited input color group among the pair of limited color groups satisfies the constraint condition, the obtained elements to be calculated among the input colors can be guaranteed to satisfy the constraint condition.

The operation of the color processing apparatus of the first embodiment will be described below in connection with a specific example. Assume now that an L*a*b* color space and a CMYK color space are used as the output color space and the input color space, respectively in the same manner as described above, and that the total amount of color materials in a printer is controlled. Color processing for calculating a combination of C, M, Y and K in the input color space satisfying the total amount control when output colors L*, a* and b* in the output color space are given will be described as an example.

The constraint condition is given by the expression:

$$C+M+Y+K=T \quad (1)$$

in which T is the threshold of total amount control. The limited input color group is a group of CMYK vector points satisfying the expression (1). The limited input color group may be extracted from CMYK patches used in color processing or may be generated in advance when there is no combination satisfying the expression (1) among the CMYK patches or when the number of combinations satisfying the expression (1) is small.

Figures 3A, 3B:
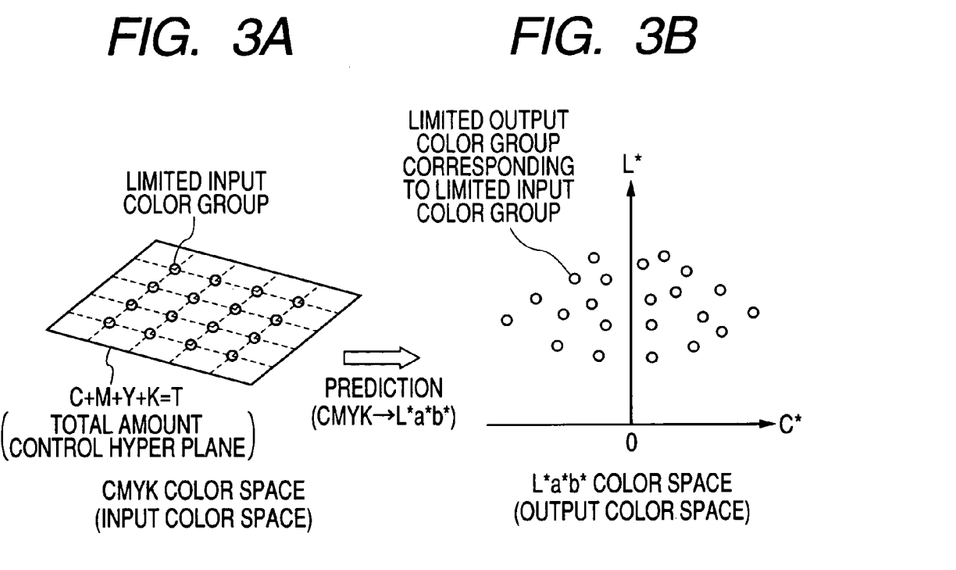
FIGS. 3A and 3B are views for explaining the outline of the operation of a limited output color group generation section.

The limited output color group generation section 21 generates a limited output color group in the L*a*b* color space corresponding to the limited input color group in the CMYK color space given by the expression (1). FIGS. 3A and 3B are views for explaining the outline of the operation of the limited output color group generation section 21. FIG. 3A shows a total amount control hyperplane on which the condition of total amount control as the constraint condition is satisfied in the input color space. FIG. 3B shows a plane containing the L* axis in the output color space. In FIG. 3B, the horizontal axis expresses C* collecting a* and b*. As shown in FIGS. 3A and 3B, limited input colors in the input color space are expressed as points on the hyperplane based on the constraint condition of the expression (1) whereas limited output colors in the output color space are scattered in the output color space.

A CMYK patch-measured color value pair (hereinafter referred to as "patch set") used in general color processing can be used for generating the limited output color group. For example, the limited output color group can be generated by a prediction method using regression analysis described in JP-A-10-262157, which is incorporated herein by reference in its entirety, or by a neural network in which correspondence between the values of CMYK in the patch set and the values of L*a*b* is learned.

Assume now that the values of CMYK in the i-th input color in the limited input color group are $(^TC_i, {}^TM_i, {}^TY_i, {}^TK_i)$, the values of L*a*b* in an output color generated by the limited output color group generation section 21 in accordance with the limited input color group are $(^TL_i, {}^Ta_i, {}^Tb_i)$, and a pair of $(^TC_i, {}^TM_i, {}^TY_i, {}^TK_i)$ and $(^TL_i, {}^Ta_i, {}^Tb_i)$ express a pair of limited color groups.

Figure 4A:
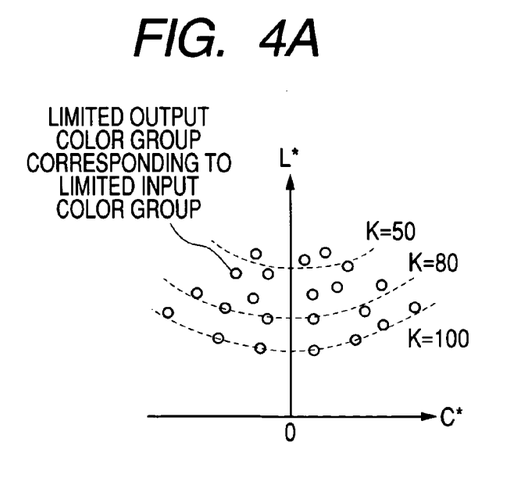
FIGS. 4A and 4B are views for explaining an example of the distribution of the limited output color group in the output color space in accordance with change in element K in the limited input color group.
Figure 4B:
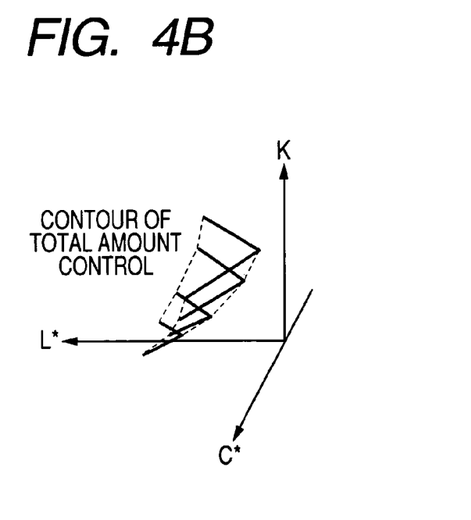

FIGS. 4A and 4B are views for explaining an example of distribution of the limited output color group in the output color space in accordance with change in element K in the limited input color group. Under the constraint of the expression (1), the limited output colors L*a*b* corresponding to the limited input colors CMYK are distributed so as to be scattered in the output color space as shown also in FIG. 3B. When the value of K in the limited input colors is fixed in this case, the values of L*a*b* corresponding to each value of K form a curved surface as represented by one of broken lines in FIG. 4A. Conversely, when the values of L*a*b* on the curved surface are decided, the value of K is decided uniquely. When, for example, the values of L*a*b* on the curved surface of K=100% represented by the lowermost broken line in FIG. 4A are given, the value of K can be decided as K=100%.

FIG. 4B shows a contour surface satisfying the expression (1) in an L*C*K space provided with a K axis perpendicular to the L*C* plane shown in FIG. 4A. That is, the broken lines in FIG. 4A are expressed three-dimensionally in FIG. 4B. As is obvious from FIG. 4B, the value of K in the contour satisfying the total amount control decreases as the value of L* increases, because the required amount of the color material of K decreases in accordance with increase in amount of the other color materials as the value of L* increases.

Figure 5A:
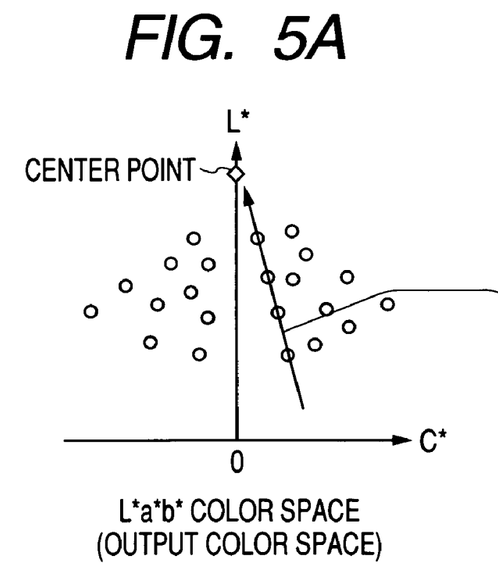
FIGS. 5A and 5B are views for explaining the relation between values of L*a*b* on a line directing a certain center point in an L*a*b* color space and a corresponding value of K.
Figure 5B:
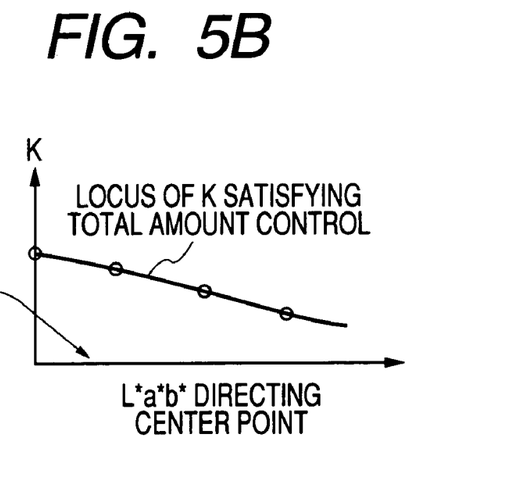

FIGS. 5A and 5B are views for explaining the relation between the values of L*a*b* on a line directing a certain center point in the L*a*b* color space and the corresponding value of K. For example, the values of L*a*b* on the line directing the certain center point represented by the rhombus in the L*a*b* color space shown in FIG. 5A have relation with the value of K corresponding to the values of L*a*b* as shown in FIG. 5B. As shown in FIG. 4A, the value of K decreases as the value of L* increases. Accordingly, it will be understood easily that the value of K decreases monotonously when the value of K corresponding to the values of L*a*b* is calculated in a direction of increasing the value of L* as represented by the arrow in FIG. 5A.

The input color element calculation section 22 uses the pair of limited color groups obtained in the aforementioned manner for calculating a part (the value of K in this example) of elements of the input colors on the basis of the given output colors (L*a*b*). The calculation can be made by use of $(^TL_i, {}^Ta_i, {}^Tb_i)$ in the pair of limited point groups and corresponding $^TK_i$. When the given values of L*a*b* are $(L_{given}, a_{given}, b_{given})$, a model for predicting the value of K on the basis of the values of L*a*b* by use of $(^TL_i, {}^Ta_i, {}^Tb_i)$ and $^TK_i$ in combination is f( ), and the predicted value of K is $K_{pred}$, the value of K satisfying the total amount control can be predicted as follows.

$$K_{pred} = f(L_{given}, a_{given}, b_{given}) \quad (2)$$

The prediction model represented by the expression (2) can be achieved by use of a pair of $(^TL_i, {}^Ta_i, {}^Tb_i)$ and $^TK_i$. For example, the prediction model may be achieved by a prediction method using regression analysis described in JP-A-10-262157 or by a neural network in which correspondence of $(^TL_i, {}^Ta_i, {}^Tb_i)$ to $^TK_i$ is learned. Alternatively, the predicted value of K can be calculated simply as a weighted average given by the following expression:

$$K_{pred} = (\Sigma_i {}^{Lab}w_i {}^TK_i)/(\Sigma_i {}^{Lab}w_i) \quad (3)$$

in which $^{Lab}w_i$ is weighting of $^TK_i$ calculated in accordance with the distance between $(L_{given}, a_{given}, b_{given})$ and $(^TL_i, {}^Ta_i, {}^Tb_i)$. It is preferable that $^{Lab}w_i$ increases as the distance decreases.

In this manner, the value of K satisfying the constraint condition of the expression (1) can be decided in accordance with the given values of L*a*b*. Because the conventional repeated search process is not required in this case, the value of K satisfying the constraint condition can be calculated at a high speed.

Figure 6:
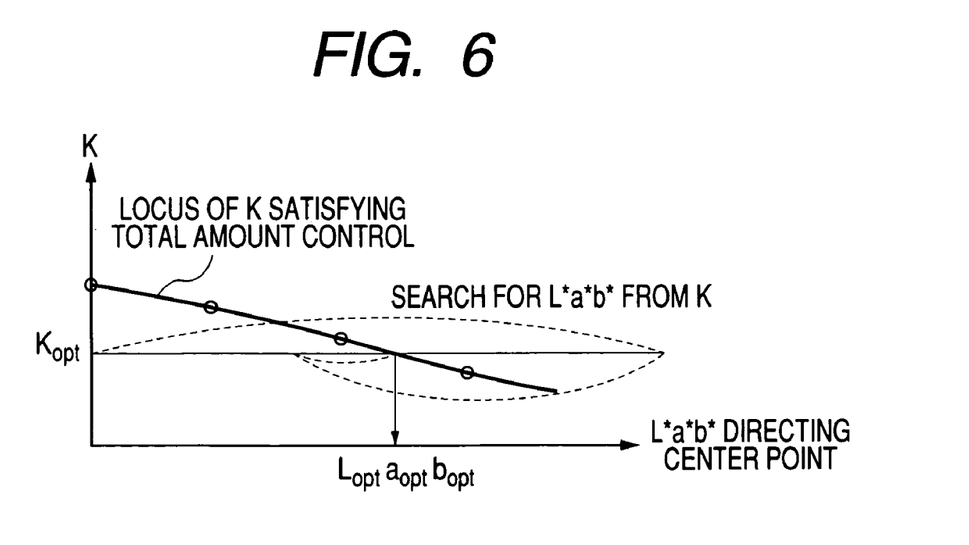
FIG. 6 is a view for explaining an example of processing for searching and calculating the values of L*a*b* corresponding to the value of K.

Incidentally, when the aforementioned pair of limited color groups are used for utilizing the expression (2), the values of L*a*b* corresponding to the value of K can be calculated conversely. FIG. 6 is a view for explaining an example of processing for searching and calculating the values of L*a*b* corresponding to the value of K. The graph represented by the solid line in FIG. 6 is the same as the graph in FIG. 5B. When, for example, $K_{opt}$ shown in FIG. 6 is given as the value of K, $(L_{opt}, a_{opt}, b_{opt})$ which are the values of L*a*b* corresponding to $K_{opt}$ can be calculated, for example, if binary search using the expression (2) is performed on a line directing the center point of L*a*b* represented by the rhombus in FIG. 5A with the center point as its end point.

If the binary search is not performed, weighted averages may be calculated as follows:

$$L_{opt} = (\Sigma_i {}^lw {}^Kw {}^TL_i)/(\Sigma_i {}^lw {}^Kw) \quad (4\text{-}1)$$

$$a_{opt} = (\Sigma_i {}^lw {}^Kw {}^Ta_i)/(\Sigma_i {}^lw {}^Kw) \quad (4\text{-}2)$$

$$b_{opt} = (\Sigma_i {}^lw {}^Kw {}^Tb_i)/(\Sigma_i {}^lw {}^Kw) \quad (4\text{-}3)$$

where $^lw$ is weighting of the distance to $(^TL_i, {}^Ta_i, {}^Tb_i)$ from the line directing the center point shown in FIG. 5A, and $^Kw$ is weighting of the distance from $K_{opt}$ to $^TK_i$. If a product of the two kinds of weighting is used, the same result as described above can be obtained. It is preferable that each of the two kinds of weighting increases as the distance decreases, like the case of $^{Lab}W_i$.

Figure 7A:
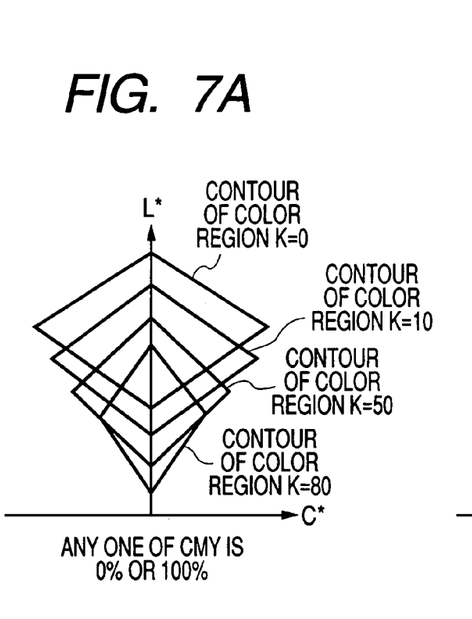
FIGS. 7A to 7C are views for explaining an example of the relation between the limited output color in the output color space and the value of K in other examples of the constraint condition.
Figure 7B:
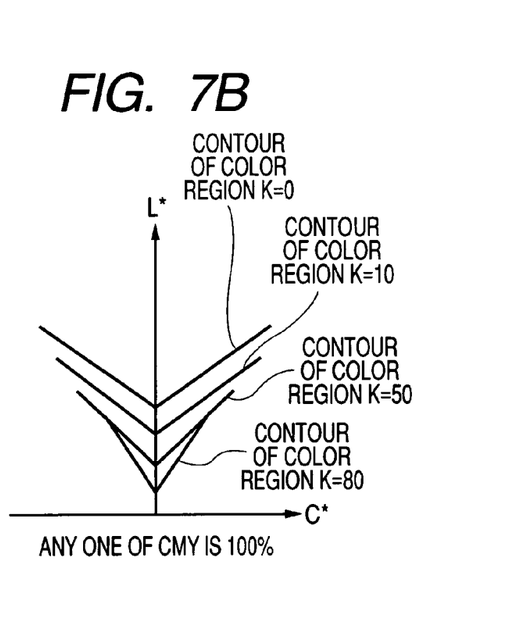
Figure 7C:
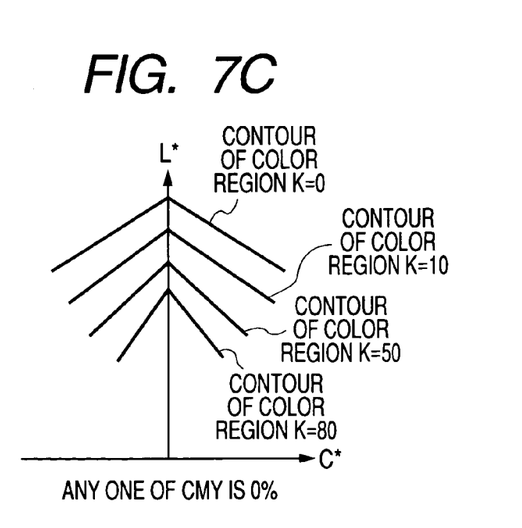

Although description has been made by way of example on the case where the condition of total amount control represented by the expression (1) is given as the constraint condition, the constraint condition is not limited thereto. Other examples of the constraint condition will be described below. FIGS. 7A to 7C are views for explaining an example of the relation between limited output colors in the output color space and the value of K in other examples of the constraint condition. In the example shown in FIG. 7A, a condition in which any one of CMY elements is 0% or 100% is given as the constraint condition. FIG. 7A shows the distribution (contour of a color region) of the limited output color group when the value of K is fixed in this case. As is obvious from FIG. 7A, the contour of a color region shaped like a rhombus is formed in accordance with each value of K. Although FIG. 7A shows the cases of K=0, 10, 50 and 80, the like contour of a color region can be obtained also when K takes another value. For example, the contours of color regions may be preferably obtained in accordance with the values of K arranged at regular intervals.

In the example shown in FIG. 7B, a condition in which any one of CMY elements is 100% is given as the constraint condition. FIG. 7B shows the case where limited output colors L*a*b* corresponding to the limited input colors CMYK are expressed in accordance with the value of K when this constraint condition is used. It is obvious that the lower surface of each rhombus shown in FIG. 7A corresponds to this.

In the example shown in FIG. 7B, one of the four elements CMYK is decided to be 100%. The relation between L*a*b* corresponding to such CMYK and K is the relation of the minimum of K required for reproducing L*a*b*. A set can be provided so that CMYK can be decided uniquely on the basis of L*a*b*.

In the example shown in FIG. 7C, one of the four elements CMYK is decided to be 0%. The relation between L*a*b* corresponding to such CMKY and K is the relation of the maximum of K required for reproducing L*a*b*. A set can be provided so that CMYK can be decided uniquely on the basis of L*a*b*.

Accordingly, when the embodiment of the invention is used, K on the color region contour and under the constraint condition can be decided on the basis of L*a*b*. (Incidentally, in the group in which any one of C, M and Y is 100%, the contour of a dark color region is used.)

It is a matter of course that the constraint condition is not limited to these examples. Any condition may be used if correspondence from output colors in the output color space to input colors in the input color space can be decided uniquely by the condition.

Figure 8:
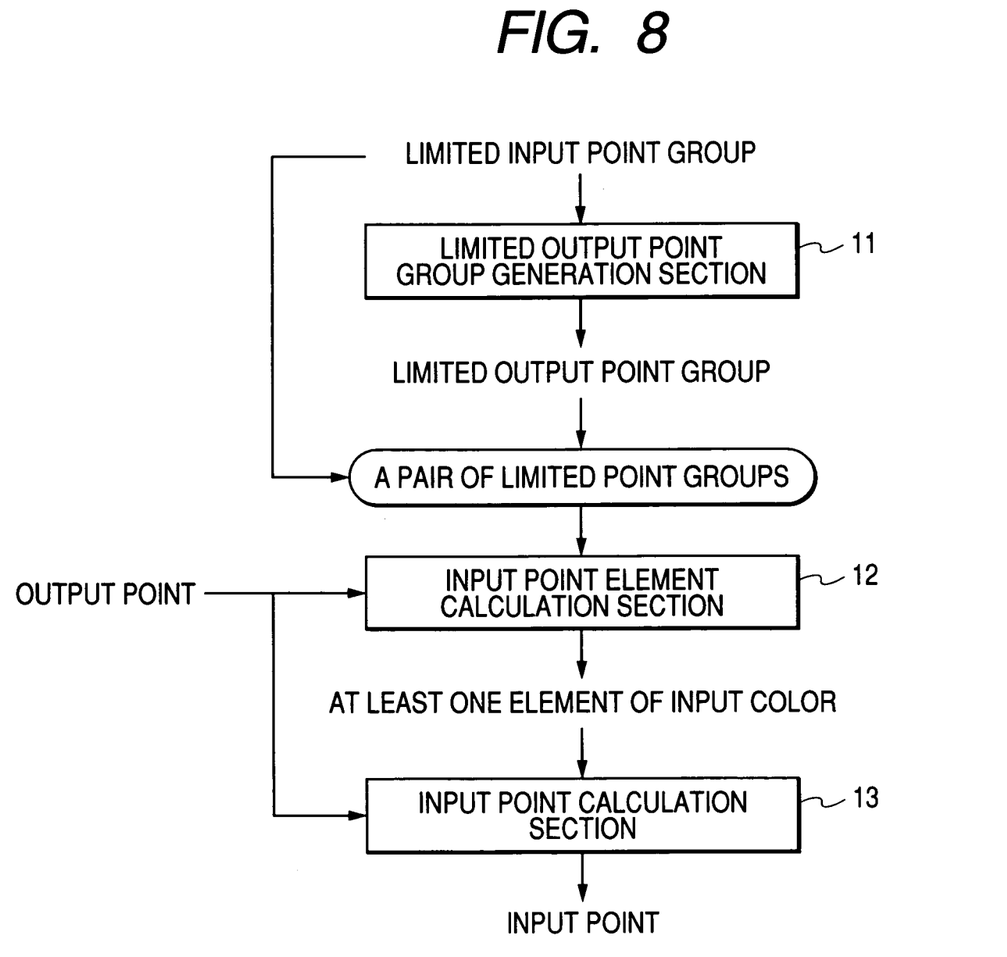
FIG. 8 is a block diagram showing a numerical processing apparatus according to a second embodiment of the invention.

FIG. 8 is a block diagram showing the numeral processing apparatus according to a second embodiment of the invention. In FIG. 8, parts the same as those in FIG. 1 are denoted by the same reference numerals as those in FIG. 1 for the sake of omission of duplicated description. In FIG. 8, the reference numeral 13 designates an input point calculation section. In the numerical processing apparatus of the first embodiment, a value of at least one element of corresponding input points is decided on the basis of the given output points. The second embodiment shows a case where values of other elements of the input points are further decided.

The input point calculation section 13 calculates the other elements of the input points corresponding to the output points on the basis of at least one element of the input points calculated by the input point element calculation section 12 and the output points. As a result, all input points satisfying the constraint condition in the input space can be calculated on the basis of the output points in the output space.

Figure 9:
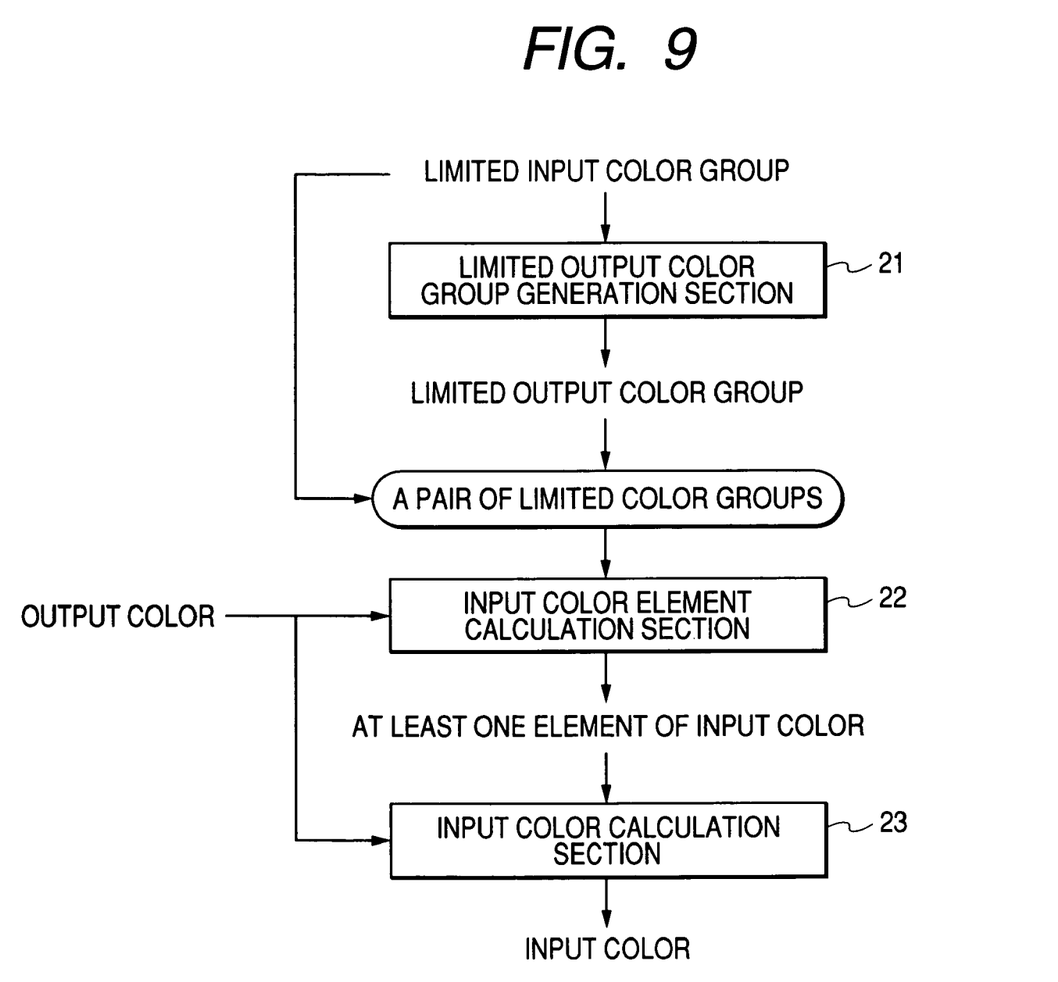
FIG. 9 is a block diagram showing a color processing apparatus according to a second embodiment of the invention.

FIG. 9 is a block diagram showing the color processing apparatus according to a second embodiment of the invention. In FIG. 9, parts the same as those in FIG. 2 are denoted by the same reference numerals as those in FIG. 2 for the sake of omission of duplicated description. In FIG. 9, the reference numeral 23 designates an input color calculation section. FIG. 9 shows the case where the second embodiment of the numerical processing apparatus shown in FIG. 8 is applied to color processing. In the color processing apparatus of the first embodiment, a value of at least one element (K) of corresponding input points (CMYK) is decided on the basis of the given output points (L*a*b*). The second embodiment shows a case where values of other elements (CMY) of the input points are further decided.

The input color calculation section 23 calculates the other elements of the input colors corresponding to the output colors on the basis of at least one element of the input colors calculated by the input color element calculation section 22 and the output colors. As a result, all input colors satisfying the constraint condition in the input space can be calculated on the basis of the output colors in the output space.

An example of the operation of the color processing apparatus according to the second embodiment of the invention will be described below in connection with a specific example. Incidentally, the description of the operation up to the input color element calculation section 22 will be omitted here because the operation is the same as in the color processing apparatus of the first embodiment.

The input color calculation section 23 predicts CMY on the basis of the given output colors L*a*b* and the value of K satisfying the constraint condition. As described above, a model used for the prediction may be constructed by a prediction method using regression analysis described in JP-A-10-262157 or by a method such as a neural network in which correspondence between CMYK in a patch set and L*a*b* is learned.

When the value of K satisfying the constraint condition in the input color space is first calculated on the basis of the given output colors L*a*b* and the values of the other CMY are then calculated on the basis of the values of L*a*b* and the value of K, the input colors CMYK satisfying the constraint condition can be obtained. According to the embodiment of the invention, an arithmetic operation can be performed without use of the conventional repeated search process which needs judgment as to whether the constraint condition is satisfied or not whenever K and CMY satisfying the constraint condition are searched for on the basis of the given output colors L*a*b*. Accordingly, processing speed can be shortened greatly compared with the background art, so that the input colors satisfying the constraint condition can be calculated in a short time on the basis of the output colors.

Incidentally, the same processing as described above can be performed also in a case where another element of the input colors than K needs to be calculated on the basis of the output colors by the input color element calculation section 22, for example, in accordance with the constraint condition as shown in FIGS. 7A to 7C. When, for example, element C is calculated, M, Y and K are calculated on the basis of L*, a*, b* and C by the input color calculation section 23. It is a matter of course that the same processing as described above can be performed in a case where two or more elements of the input colors are calculated by the input color element calculation section 22. When, for example, C and K of the input colors are calculated, M and Y are calculated on the basis of L*, a*, b*, C, and K by the input color calculation section 23. In this manner, any combination may be used if elements of the input colors required for calculating solutions in the input color space (e.g., CMYK) higher in dimension than the output color space (e.g., L*a*b*) are given.

Figure 10:
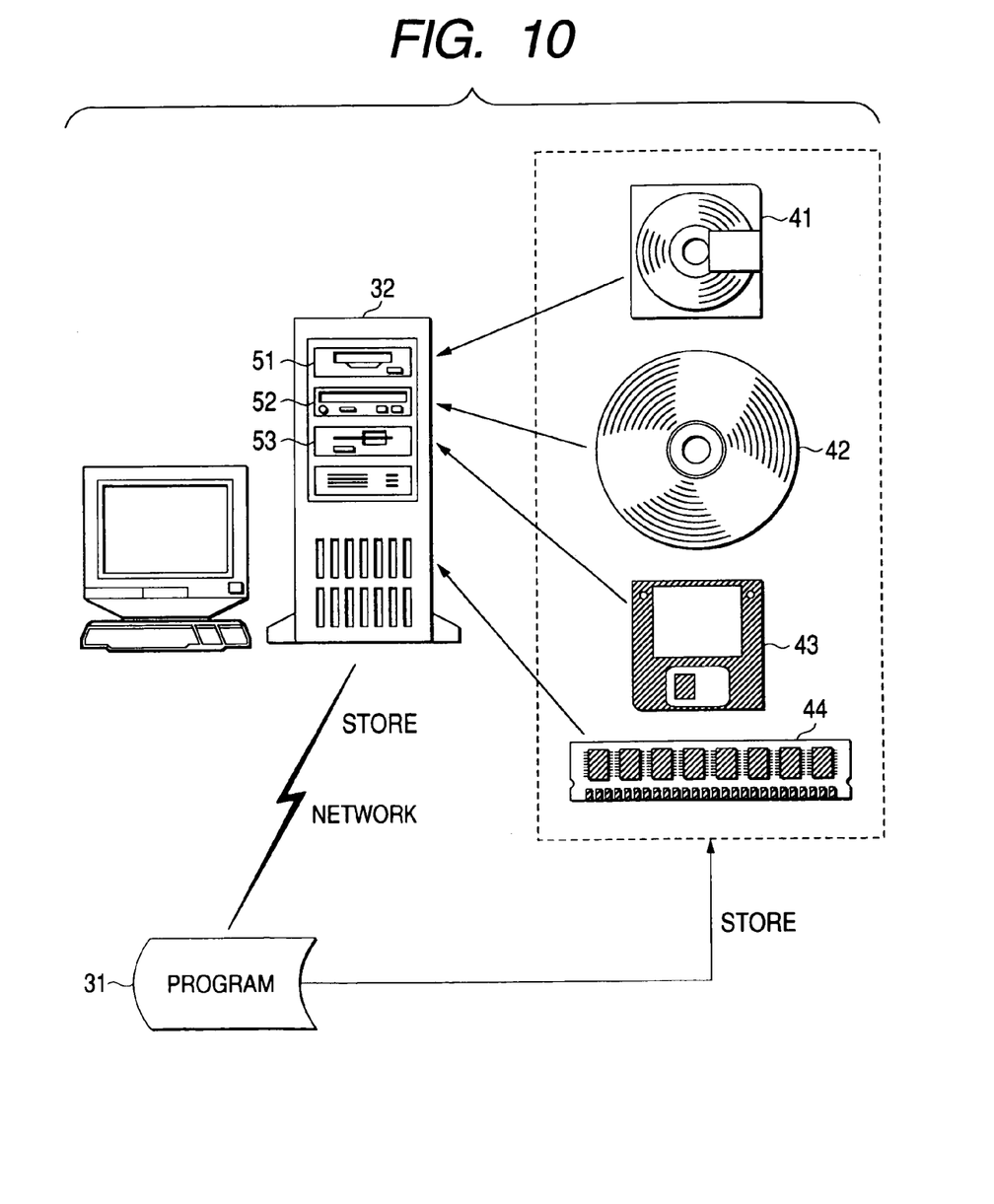
FIG. 10 is a view for explaining a computer program and a storage medium for storing the computer program by way of example in the case where the function of the numerical processing apparatus/color processing apparatus according to the invention is achieved by the computer program.

FIG. 10 is a view for explaining an example of a computer program and a storage medium for storing a computer program in a case where the function of the numerical processing apparatus/color processing apparatus according to the embodiment of the invention is achieved by the computer program. In FIG. 10, the reference numeral 31 designates a program; 32, a computer; 41, an opto-magnetic disk; 42, an optical disk; 43, a magnetic disk; 44, a memory; 51, an opto-magnetic disk device; 52, an optical disk device; and 53, a magnetic disk device.

Part or all of the function of the numerical processing apparatus/color processing apparatus can be achieved by a program 31 which can be executed by a computer. In this case, the program 31 and data, etc. used by the program may be stored in a storage medium which can be read by the computer. The concept "storage medium" means a medium in which the state of change in energy such as magnetic energy, optical energy or electric energy can be generated in a reader provided in hardware resources of the computer in accordance with the descriptive contents of the program so that the descriptive contents of the program can be transmitted to the reader in the form of a signal corresponding to the state of change in energy. Examples of the storage medium include an opto-magnetic disk 41, an optical disk 42 (inclusive of a CD, a DVD, etc.), and a magnetic disk 43, a memory 44 (inclusive of an IC card, a memory card, etc.). It is a matter of course that these recording media are not limited to portable media.

The program 31 is stored in any one of these recording media in advance. When the storage medium is mounted in the opto-magnetic disk device 51, the optical disk device 52, the magnetic disk device 53 or a memory slot not shown in the computer 32, the program 31 can be read from the computer to execute the function of the numerical processing apparatus/color processing apparatus according to the invention. Alternatively, a storage medium may be mounted in the computer 32 in advance so that the program 31 is transmitted to the computer 32 through a network or the like and stored in the storage medium so as to be executed.

It is a matter of course that part or all of the function may be constructed by hardware. Alternatively, the function may be installed as part of other software.

What is claimed is:

1. A numerical processing apparatus for deciding correspondence from output points in an output space of m dimensions to input points in an input space of n dimensions wherein m is smaller than n, the numerical processing apparatus comprising:
    a limited output point group generation unit that generates limited output points in the output space respectively corresponding to limited input points satisfying a predetermined constraint condition that is set in the input space in advance, to generate a plurality of limited pairs each consisting of a limited input point and a corresponding limited output point; and
    an input point element determination unit that generates an inverse mapping function from the output space onto the input space based on the plurality of limited pairs and determines at least one element of the input point satisfying the constraint condition, when an output point is given, using the inverse mapping function.

2. The numerical processing apparatus according to claim 1, wherein the constraint condition includes a condition in which the correspondence from output points to input points is decided uniquely.

3. The numerical processing apparatus according to claim 1, wherein the input point element determination unit determines at least one of n elements of the input points on the basis of the limited output point group and a group of elements to be determined in the limited input point group corresponding to the limited output point group.

4. The numerical processing apparatus according to claim 1, further comprising:
    an input point determination unit that determines the residual elements of the input points on the basis of the given output point and at least one element of the input points determined by the input point element determination unit.

5. A color processing apparatus for deciding correspondence from output colors in an output color space of m dimensions to input colors in an input color space of n dimensions wherein m is smaller than n, the color processing apparatus comprising:
    a limited output color group generation unit that generates limited output colors in the output color space respectively corresponding to limited input colors satisfying a predetermined constraint condition that is set in the input color space in advance, to generate a plurality of limited pairs each consisting of a limited input color and a corresponding limited output color; and
    an input color element determination unit that generates an inverse mapping function from the output color space onto the input color space based on the plurality of limited pairs and determines at least one element of the input color satisfying the constraint condition, when an output color is given, using the inverse mapping function.

6. The color processing apparatus according to claim 5, wherein:
    the input color space includes an element of black; and
    the constraint condition includes a condition of the input colors in which the output colors corresponding to the input colors are distributed on a curved surface corresponding to a value of black, which is the element of the input colors.

7. The color processing apparatus according to claim 5, wherein:
    the input color space includes four elements of cyan, magenta, yellow and black; and
    the constraint condition includes a condition that a sum of cyan, magenta, yellow and black takes a value decided in advance.

8. The color processing apparatus according to claim 5, wherein:
    the input color space includes four elements of cyan, magenta, yellow and black; and
    the constraint condition includes a condition that at least one of cyan, magenta and yellow takes a maximum value in an allowable range.

9. The color processing apparatus according to claim 5, wherein:
    the input color space includes four elements of cyan, magenta, yellow and black; and
    the constraint condition includes a condition that at least one of cyan, magenta and yellow takes a minimum value in an allowable range.

10. The color processing apparatus according to claim 5, wherein:

the input color space includes four elements of cyan, magenta, yellow and black, the color processing apparatus further comprising:

an input color determination unit that determines the residual elements of the input colors on the basis of the output color and at least one of the elements of cyan, magenta, yellow and black of the input color determined by the input color element determination unit.

11. A numerical processing method for deciding correspondence from output points in an output space of m dimensions to input points in an input space of n dimensions, wherein m is smaller than n, the numerical processing method comprising:

generating limited output points in the output space respectively corresponding to limited input points satisfying a predetermined constraint condition that is set in the input space in advance, to generate a plurality of limited pairs each consisting of a limited input point and a corresponding limited output point;

generating an inverse mapping function from the output space onto the input space based on the plurality of limited pairs; and determining at least one element of the input point satisfying the constraint condition, when an output point is given, using the inverse mapping function.

12. A color processing method for deciding correspondence from output colors in an output color space of m dimensions to input colors in an input color space of n dimensions, wherein m is smaller than n, the color processing method comprising:

generating limited output colors in the output color space respectively corresponding to limited input colors satisfying a predetermined constraint condition that is set in the input color space in advance, to generate a plurality of limited pairs each consisting of a limited input color and a corresponding limited output color;

generating an inverse mapping function from the output color space onto the input color space based on the plurality of limited pairs; and determining at least one element of the input color satisfying the constraint condition, when an output color is given, using the inverse mapping function.

13. A computer readable storage medium storing a color processing program that when executed, causes a computer to execute a numerical processing for deciding correspondence from output points in an output space of m dimensions to input points in an input space of n dimensions, wherein m is smaller than n, the numerical processing program comprising:

generating limited output points in the output space respectively corresponding to limited input points satisfying a predetermined constraint condition that is set in the input space in advance, to generate a plurality of limited pairs each consisting of a limited input point and a corresponding limited output point;

generating an inverse mapping function from the output space onto the input space based on the plurality of limited pairs; and determining at least one element of the input point satisfying the constraint condition, when an output point is given, using the inverse mapping function.

14. A computer readable storage medium storing a color processing program that when executed, causes a computer to execute a color processing for deciding correspondence from output colors in an output color space of m dimensions to input colors in an input color space of n dimensions, wherein m is smaller than n, the color processing program comprising:

generating limited output colors in the output color space respectively corresponding to limited input colors satisfying a predetermined constraint condition that is set in the input color space in advance, to generate a plurality of limited pairs each consisting of a limited input color and a corresponding limited output color;

generating an inverse mapping function from the output color space onto the input color space based on the plurality of limited pairs; and determining at least one element of the input color satisfying the constraint condition, when an output color is given, using the inverse mapping function.

* * * * *